United States Patent
Zeidan et al.

(10) Patent No.: US 12,492,928 B2
(45) Date of Patent: Dec. 9, 2025

(54) FLOW METER AND ASSEMBLY METHOD THEREFOR

(71) Applicant: INTEGRA METERING SAS, Blagnac (FR)

(72) Inventors: Marwan Zeidan, Montauban (FR); Clémentine Pouget, Toulouse (FR); Maxime Morin, Toulouse (FR); Alain Ramond, Toulouse (FR)

(73) Assignee: INTEGRA METERING SAS, Blagnac (FR)

( * ) Notice: Subject to any disclaimer, the term of this patent is extended or adjusted under 35 U.S.C. 154(b) by 287 days.

(21) Appl. No.: 18/011,129

(22) PCT Filed: Jun. 17, 2021

(86) PCT No.: PCT/FR2021/051099
§ 371 (c)(1),
(2) Date: Dec. 16, 2022

(87) PCT Pub. No.: WO2021/255397
PCT Pub. Date: Dec. 23, 2021

(65) Prior Publication Data
US 2023/0175875 A1    Jun. 8, 2023

(30) Foreign Application Priority Data

Jun. 19, 2020   (FR) ...................................... 2006423

(51) Int. Cl.
*G01F 1/667*   (2022.01)
*G01F 1/66*    (2022.01)
(52) U.S. Cl.
CPC .............. *G01F 1/667* (2013.01); *G01F 1/662* (2013.01)
(58) Field of Classification Search
None
See application file for complete search history.

(56) References Cited

U.S. PATENT DOCUMENTS

| | | | |
|---|---|---|---|
| 5,705,753 A | 1/1998 | Hastings et al. | |
| 8,181,533 B2 * | 5/2012 | Allen | G01F 1/662 |
| | | | 73/861.27 |

(Continued)

FOREIGN PATENT DOCUMENTS

| | | |
|---|---|---|
| CN | 108548580 | 9/2018 |
| DE | 102011101257 | 11/2012 |
| WO | 9844318 | 10/1998 |

OTHER PUBLICATIONS

International Search Report dated Sep. 29, 2021.

*Primary Examiner* — Mark A Shabman
(74) *Attorney, Agent, or Firm* — IPSILON USA, LLP (57) ABSTRACT

The invention concerns a flowmeter including:
- pipe (2) for measuring the flowrate of a fluid, said pipe extending along a longitudinal axis (10, 110),
- a first ultrasound transducer (36, 37) and a second ultrasound transducer (46, 47) are mounted facing one another relative to a wall of said pipe,
- a first housing (30) and a second housing (40) each delimiting an internal volume to receive said first and second ultrasound transducers, respectively,
- at least one electronic circuit card (65),
- a main receptacle (6) to receive said electronic circuit card,
- a first duct (50) and a second duct connecting the internal volume to receive said electronic circuit card to the internal volumes to receive said first transducer and said second transducer, each duct being formed within the wall of said pipe.

The invention also concerns a method of assembling a flowmeter of the above kind.

15 Claims, 9 Drawing Sheets

(56) References Cited

U.S. PATENT DOCUMENTS

| | | | | |
|---|---|---|---|---|
| 10,557,733 B2* | 2/2020 | Fang | ........................ | G01F 1/667 |
| 11,619,527 B2* | 4/2023 | Straub, Jr. | ................ | G01F 1/662 |
| | | | | 310/334 |
| 11,796,360 B2* | 10/2023 | Bertram | .................. | G01F 1/662 |
| 2008/0271529 A1* | 11/2008 | Davies | .................... | G01F 15/18 |
| | | | | 73/431 |
| 2010/0242590 A1* | 9/2010 | Day | ........................ | G01F 15/02 |
| | | | | 73/204.22 |
| 2011/0162460 A1* | 7/2011 | Allen | ...................... | G01F 1/667 |
| | | | | 310/336 |
| 2012/0247225 A1* | 10/2012 | Allen | ...................... | G01F 1/662 |
| | | | | 73/861.18 |
| 2014/0103274 A1* | 4/2014 | McDonald | ............. | G01F 15/00 |
| | | | | 254/134.3 R |
| 2015/0128723 A1* | 5/2015 | Satou | .................... | G10K 11/18 |
| | | | | 367/189 |
| 2016/0282160 A1* | 9/2016 | Mezheritsky | ........... | G01F 1/667 |
| 2023/0273056 A1* | 8/2023 | Sitnikov | ................. | G01F 1/661 |
| | | | | 702/48 |

* cited by examiner

FLOW METER AND ASSEMBLY METHOD THEREFOR

RELATED APPLICATION

This application is a National Phase of PCT/FR2021/051099 filed on Jun. 17, 2021, which claims the benefit of priority from French Patent Application No. 20 06423, filed on Jun. 19, 2020, the entirety of which are incorporated by reference.

FIELD OF THE INVENTION

The invention concerns a flowmeter and its method of assembly.

Measuring a travel time of an ultrasound wave in a fluid by means of at least one ultrasound transducer enables deduction therefrom of the flowrate of the fluid. There exist numerous categories of ultrasound flowmeters in which the flowrate of a fluid is measured by the speed of propagation of an ultrasound wave in a fluid circulating in a pipe.

The present invention applies to flowmeters in which the transducer or at least its mounting device passes through the wall of the pipe to come into contact with the fluid the flowrate of which is to be measured and to flowmeters in which the transducers and/or their mounting device are installed outside the pipe and the measurement by which is effected by transmission of waves through the walls of the latter.

PRIOR ART

There is already known from the document FR 3 047 068 a mounting device for an ultrasound transducer adapted to be mounted through a wall of a flowmeter including a pipe, said device being adapted to orient an emission/reception direction of the transducer in a diagonal direction, also known as the measurement direction, at a predetermined angle to a longitudinal axis of the pipe in a plane of longitudinal symmetry of the latter.

Flowmeters including transducers oriented in this way with a measurement direction in a diagonal direction relative to the pipe generally have an overall size greater than other flowmeters with the transducers of which would in particular be disposed on the same side of the pipe. Moreover, the configuration of the transducers in flowmeters of this kind raises the problem of the reliability of the assembly of the various components of said flowmeter and of placing electrical connections between the transducers and an electronic circuit card of the flowmeter.

OBJECTS AND SUMMARY

The invention therefore aims to propose a flowmeter and an assembly method that enable facilitated assembly of the components of said flowmeter whilst achieving excellent robustness and excellent reliability of the electrical connections between the various components of the flowmeter.

The invention also makes it possible to propose a flowmeter that can be mass produced at costs compatible with its use at the industrial scale and with an application in the usual uses, for example for the measurement of flowrate in water supply pipes.

To be more precise, the invention has for object a flowmeter including a pipe for measuring the flowrate of a fluid, said pipe extending along a longitudinal axis, at least one first ultrasound transducer and at least one second ultrasound transducer, said ultrasound transducers being mounted facing one another relative to a wall of said pipe, at least one first housing delimiting an internal volume to receive said first ultrasound transducer and at least one second housing delimiting an internal volume to receive said second ultrasound transducer, lateral covers adapted to block the opening of each housing, at least one electronic circuit card electrically connected to the first ultrasound transducer and to the second ultrasound transducer, a main receptacle including a main opening and a bottom, the concavity of said main receptacle being oriented away from a longitudinal axis of the pipe, said main receptacle delimiting an internal volume to receive said electronic circuit card.

The flowmeter is characterized in that it includes:

at least one first duct connecting the internal volume to receive said electronic circuit card of said receptacle to the internal volume to receive said first ultrasound transducer, the first duct being formed within the wall of said pipe, at least one second duct connecting the internal volume to receive said electronic circuit card of said receptacle to the internal volume to receive said second ultrasound transducer, the second duct being formed within the wall of said pipe, a packing material chosen in a group formed of thermoset resins, said packing material filling at least in part said internal volume to receive said first ultrasound transducer, said internal volume to receive said second ultrasound transducer, said first duct and said second duct, said packing material further filling at least in part said internal volume to receive said electronic circuit card.

Said first pipe and said second pipe that connect the main receptacle respectively to the first housing and the second housing to receive the transducers are adapted to allow the flow of a packing material in liquid form. Said packing material can therefore be introduced in liquid form (the viscosity of which may vary as a function of the nature of the packing material used and of the temperature in particular) only via the main receptacle or one of the housings to receive the transducers and to spread at least into each housing to receive a transducer, the first pipe, the second pipe and the main receptacle. This enables the contacts and the electrical cables of the electronic circuit card and also the transducers to be embedded in the packing material. The packing material thus provides a seal between the electronic circuit card and the transducers, which improves the robustness of the flowmeter.

In some embodiments of the invention each housing includes an opening and a bottom, the concavity of each housing being oriented away from the longitudinal axis of said pipe.

In some embodiments of the invention said flowmeter includes lateral covers adapted to block each opening.

In some embodiments of the invention said lateral covers are transparent. This has the advantage of enabling viewing of the components disposed inside each housing.

In some embodiments of the invention, said flowmeter includes a main cover adapted to block the main opening of said main receptacle. The main cover may advantageously block the main opening of said main receptacle temporarily.

In particular, said packing material is chosen in the group formed of epoxide (or epoxy) resins, polyurethanes, silicones (in particular polydimethylsiloxanes (PDMS)), copolymers thereof and mixtures thereof.

In some embodiments of the invention the wall of the pipe has an increased thickness in each zone in which a pipe is formed so as to form a rib in which a pipe is at least partly formed. The extra thickness in the vicinity of the pipe accommodates the pipe and limits the increase in the volume of the wall of the pipe. This reduces production complexity and costs.

In some embodiments of the invention said packing material completely fills said internal volume to receive said first ultrasound transducer and said internal volume to receive said second ultrasound transducer.

In some embodiments of the invention said flowmeter further includes at least one first electric cable extending in said first duct so as electrically to connect said first ultrasound transducer to said electronic circuit card and at least one second electric cable extending in said second duct so as electrically to connect said second ultrasound transducer to said electronic circuit card.

In some embodiments of the invention said flowmeter further includes a casing containing said electronic circuit card, said casing being disposed in the internal volume of said main receptacle.

In some embodiments of the invention said electronic circuit card is disposed in said casing so as to extend in a plane orthogonal to the longitudinal axis of the pipe.

In a particularly advantageous variant said first ultrasound transducer and said second ultrasound transducer extend in a direction orthogonal to the longitudinal axis of said pipe.

In a particularly advantageous variant said flowmeter includes four ultrasound transducers, the receiving internal volume of each of said first and second housings receiving two ultrasound transducers. Accordingly, said first housing delimits an internal volume to receive said first ultrasound transducer and a third ultrasound transducer and said second housing delimits an internal volume to receive said second ultrasound transducer and a fourth ultrasound transducer.

In some embodiments of the invention each ultrasound transducer includes a piezoelectric plate and two conductive pins electrically connected to said electronic circuit card.

The invention also encompasses a method of assembling a flowmeter of this kind.

The invention therefore also concerns a method of assembling a flowmeter of this kind, characterized in that it includes the following steps:
- said first ultrasound transducer is mounted in the internal volume to receive said first ultrasound transducer of said first housing and said second ultrasound transducer is mounted in the internal volume to receive said second ultrasound transducer of said second housing,
- said electronic circuit card is mounted in the internal volume to receive said electronic circuit card of said main receptacle,
- said electronic circuit card is electrically connected to the first ultrasound transducer and to the second ultrasound transducer,
- after electrically connecting said electronic circuit card to the first ultrasound transducer and to the second ultrasound transducer a packing material is introduced in liquid form via the main opening of the main receptacle,
- a step is carried out of polymerizing and/or hardening said packing material, and
- before introducing said packing material in liquid form, the openings of each housing are blocked by lateral covers.

In some embodiments of the invention, in said method, at least one first electric cable is introduced into the first duct electrically connecting the first ultrasound transducer to the electronic circuit card and at least one second electric cable is introduced into the second duct and at least one second electric cable is introduced into the second duct electrically connecting the second ultrasound transducer to the electronic circuit card. These cables enable electrical connection of said electronic circuit card to the first ultrasound transducer and to the second ultrasound transducer. In some embodiments of the invention two electrical cables are in particular introduced into the first pipe electrically connecting the first ultrasound transducer to the electronic circuit card and two electrical cables are introduced into the second pipe electrically connecting the second ultrasound transducer to the electronic circuit card. It is also possible to pass other cables through each of said first and second pipes.

In some embodiments of the invention said method further includes a step during which said electronic circuit card is disposed in a casing and said casing is mounted in the internal volume of said main receptacle.

In some embodiments of the invention in said method, before the introduction of said packing material in liquid form, the openings of each housing are blocked by said lateral covers.

In some embodiments of the invention, said method further includes a step during which at least the internal volume of said main receptacle is subjected to a pressure below atmospheric pressure. For example the internal volume of said main receptacle may be connected to a suction source (so as to produce a vacuum) or the flowmeter may be disposed in a vacuum enclosure.

The assembly method according to the invention further includes the following steps:
- at least one user interface is procured including a display, an electrical accumulator and communication means,
- the main cover is removed from the main receptacle 6,
- a packing material in liquid form is introduced via the main opening of the main receptacle so as to fill all or part of the remaining empty volume of the internal volume of the main receptable,
- the user interface is electrically connected to the electronic circuit card and the user interface is positioned in a remaining empty volume of the internal volume of the main receptacle,
- the flowmeter is turned over so that the packing material coats the user interface,
- a step is carried out of polymerizing and/or hardening said packing material,
- the main cover is placed on the main receptacle 6.

The invention also concerns a flowmeter and a method characterized, in combination or not, by some or all of the features mentioned hereinabove or hereinafter. Whatever the formal presentation thereof, unless explicitly indicated to the contrary, the various features mentioned hereinabove or hereinafter must not be considered as closely or inextricably linked, as the invention may concern only one of these structural or functional features or only some of these structural or functional features or only part of one of those structural or functional features or again any group, combination or juxtaposition of some or all of these structural or functional features.

BRIEF DESCRIPTION OF THE DRAWINGS

Other aims, features and advantages of the invention will become apparent on reading the following description given by way of non-limiting example of some possible embodiments thereof that refers to the appended figures in which.

DETAILED DESCRIPTION

The flowmeters 1 and 101 represented in FIGS. 1 to 9 include a pipe 2, 102 adapted to enable the circulation of a fluid inside said pipe, said pipe extending along a longitudinal axis 10, 110. A pipe of this kind may for example be made of cast iron or metal (metals or metal alloys).

In a first embodiment of a flowmeter according to the invention represented in FIGS. 1 to 7 the pipe 2 has the general shape of a tube terminated at the two ends by annular connectors 73, 74 adapted to be assembled to the pipes by means of assembly members such as nuts and bolts. Between the connectors 73, 74 the pipe may have a fluid passed through it from a fluid inlet 70 to a fluid outlet 71.

The flowmeter 1 includes four ultrasound transducers 36, 37, said ultrasound transducers being mounted two by two facing one another relative to a wall of said pipe. Each ultrasound transducer 36, 37 is disposed in a housing 30, 40 delimiting an internal volume to receive said ultrasound transducers. The flowmeter 1 includes a first housing 30 delimiting an internal volume to receive two ultrasound transducers 36, 37 and a second housing 40 delimiting an internal volume to receive two other ultrasound transducers (not represented).

Alternatively, it is equally possible to provide only one ultrasound transducer in each housing 30, 40. The advantage of providing transducers mounted in pairs lies in increasing the accuracy of the measurement carried out by the flowmeter. A flowmeter according to the invention can therefore include only two ultrasound transducers that is to say at least two ultrasound transducers.

Figure 1:
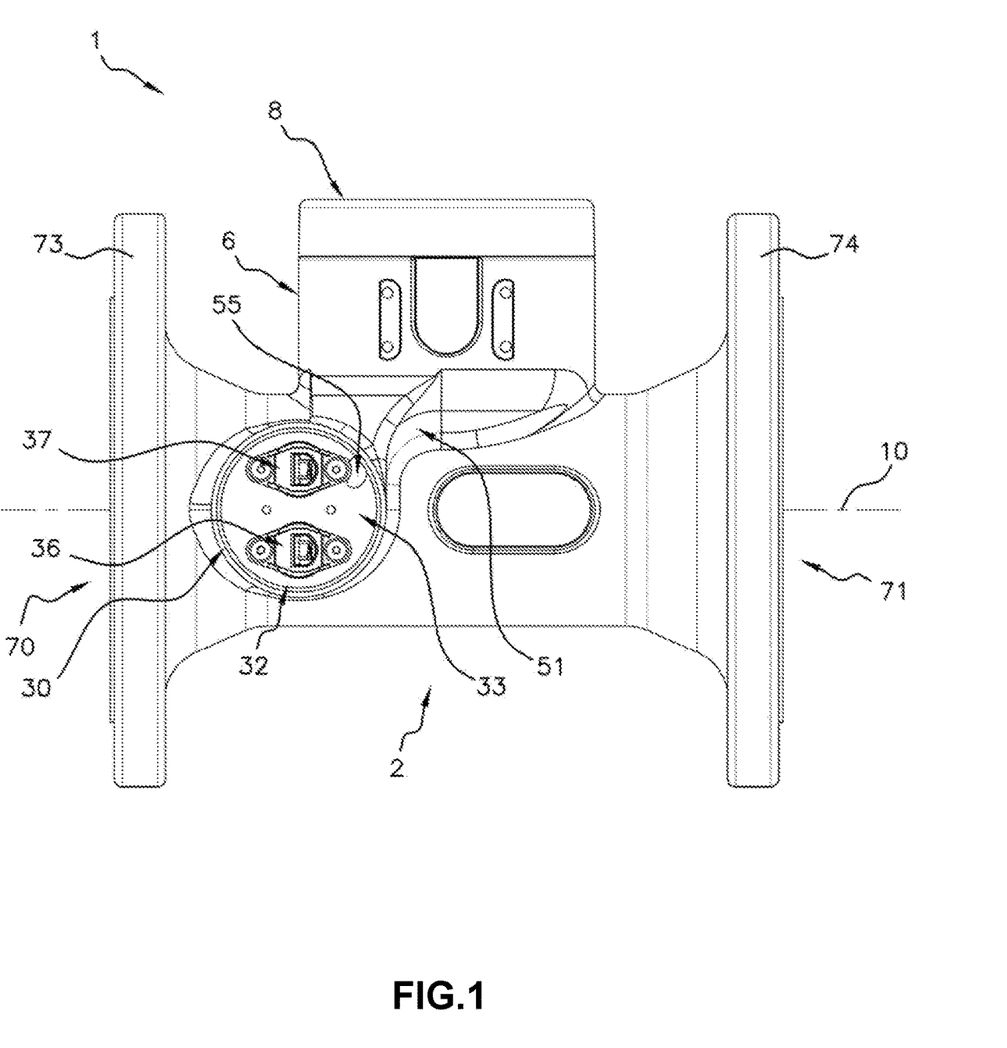
FIG. 1 is a front view of a flowmeter according to a first embodiment of the invention.
Figure 4:
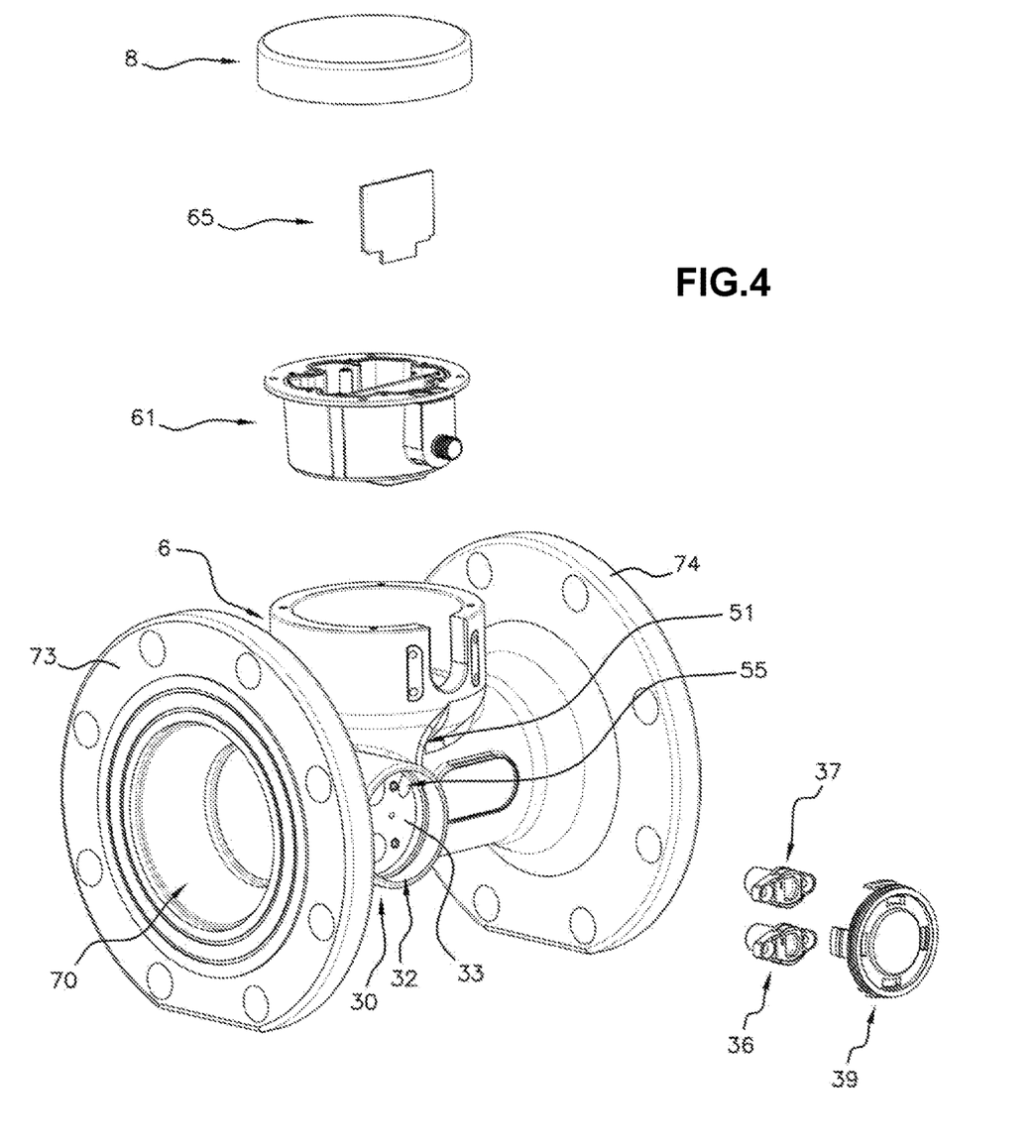
FIG. 4 is an exploded view of a flowmeter according to the first embodiment of the invention.
Figure 5:
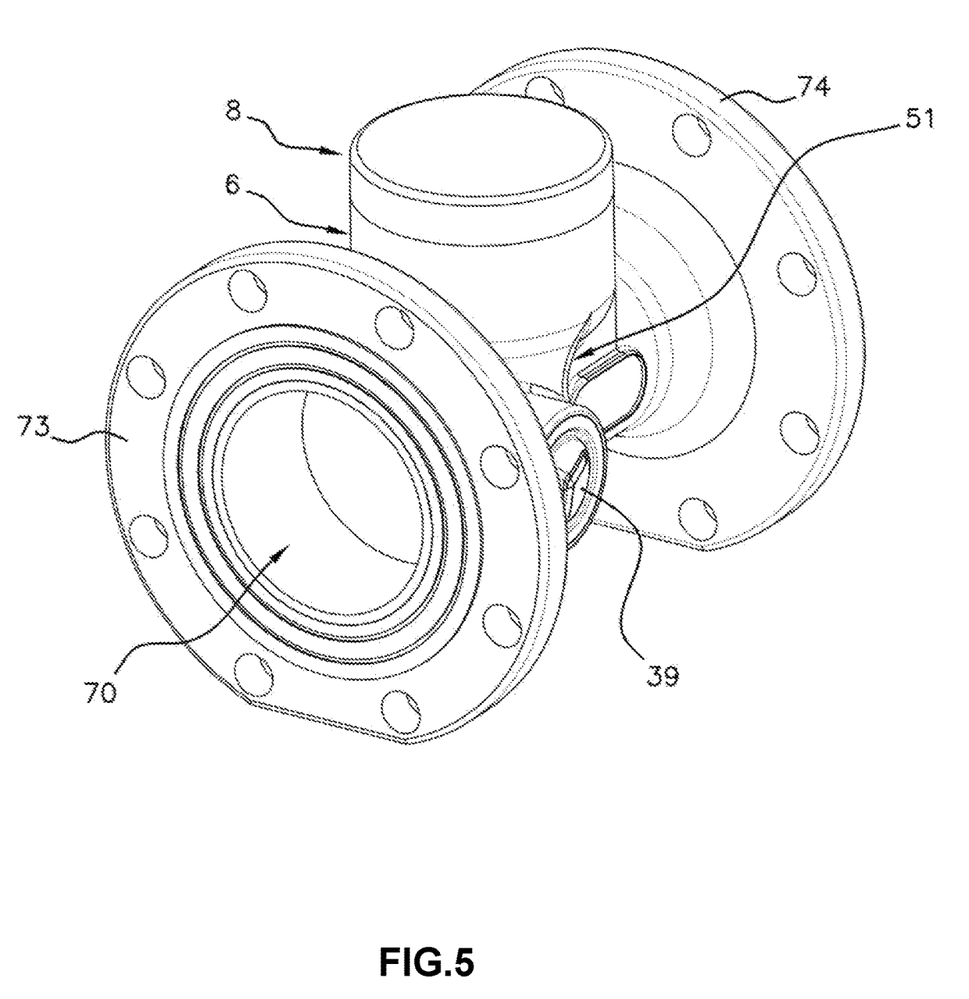
FIG. 5 is a perspective view of a flowmeter according to the first embodiment of the invention.
Figure 6:
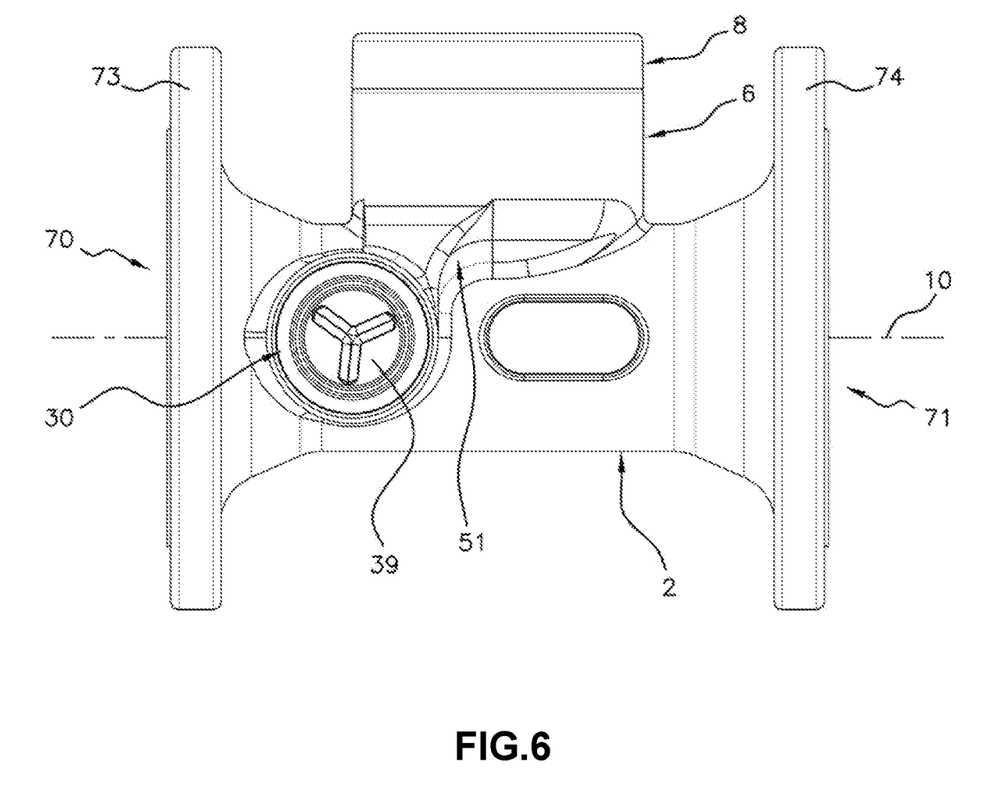
FIG. 6 is a front view of a flowmeter according to the first embodiment of the invention.

Each housing 30, 40 includes an opening and a bottom, the concavity of each housing being oriented away from the longitudinal axis 10 of said pipe, that is to say toward the outside of the pipe 2. In other words, the opening 32 of each housing 30, 40 is disposed toward the exterior of the pipe 2, the bottom 33 of each housing therefore being located closer to the longitudinal axis 10 of the pipe 2 than the opening of each housing 30, 40 with respect to said longitudinal axis 10 of the pipe. As can be seen in FIGS. 1 and 4, in the embodiment represented the housing 30 includes a circular opening 32 and a flat bottom 33. Similarly, the housing 40 includes a circular opening 42 (FIG. 2) and a bottom (not represented). The bottom 33 of each housing 30, 40 includes two niches adapted to receive the distal ends of the transducers 36, 37.

Figure 7:
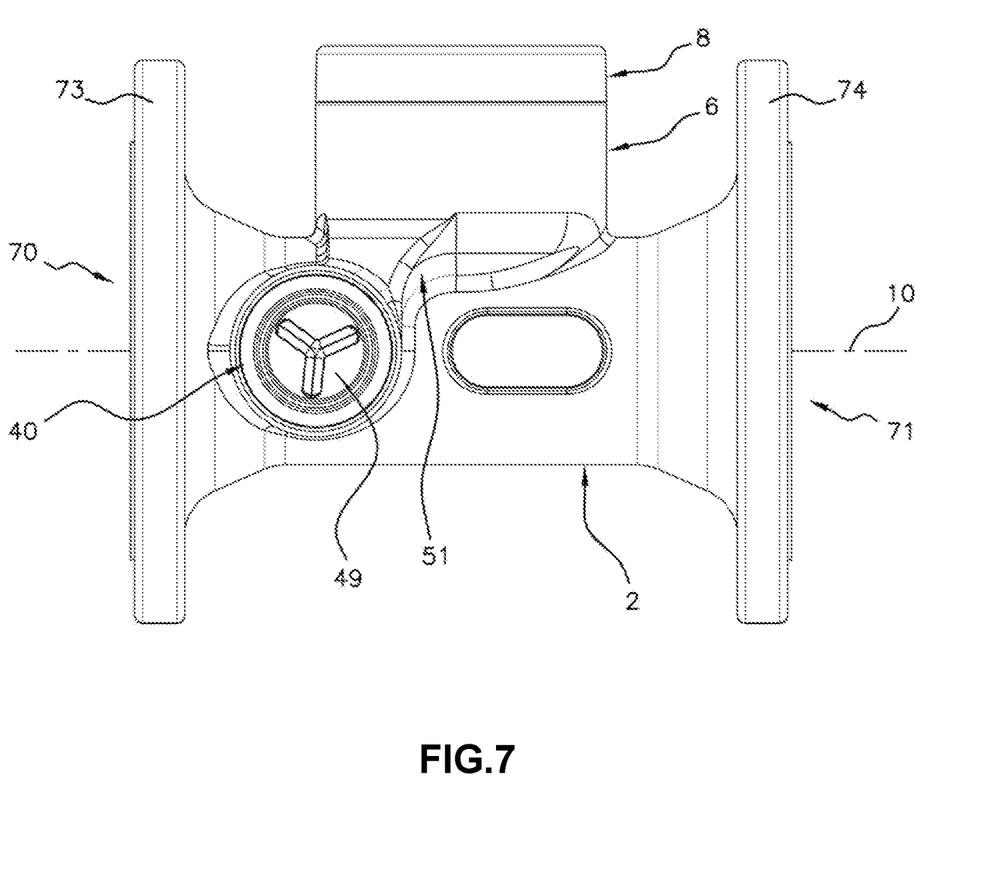
FIG. 7 is a front view of a flowmeter according to the first embodiment of the invention from the side opposite that represented in FIG. 6.

The flowmeter further includes the lateral cover 39, 49 adapted to block the opening of each housing 30, 40, the lateral cover 39 blocking the opening of the housing 30 (FIG. 6) and the cover 49 blocking the opening of the housing 40 (FIG. 7). Lateral covers 39, 49 of this kind are preferably made of transparent material (for example a polymer material transparent to visible light, such as polymethacrylate (PMMA) or polystyrene).

The ultrasound transducers mounted in pairs facing one another on the pipe 2 are oriented according to a measurement direction at a non-zero angle less than 90° to the longitudinal axis of the pipe 2. In particular, the ultrasound transducers are disposed diagonally relative to one another facing the pipe 2. To be more precise, the ultrasound transducers are placed on either side of a tubular section forming the pipe 2 so that each is disposed in one of the receiving internal volumes delimited by the first housing 30 and the second housing 40. In particular, in a variant of a flowmeter 1 according to the invention and as represented in the figures the ultrasound transducers 36, 37 are mounted through the wall of the pipe 2. In a particular advantageous variant of a flowmeter according to the invention the angle between the measurement direction and the longitudinal axis of the pipe 2 is of the order of 30°, but it may be up to 50° or even more, depending on the flowmeter model.

In a particularly advantageous variant, the ultrasound transducers 36, 37 extend in a direction orthogonal to the longitudinal axis of said pipe 2. Accordingly, and in the same manner, the housings 30, 40 extend in a direction orthogonal to the longitudinal axis 10 of said pipe 2, that is to say the wall forming each housing 30, 40 extends in a direction orthogonal to the longitudinal axis 10 of the pipe 2. In the first embodiment represented in FIGS. 1 to 7 each housing 30, 40 has a wall in the form of a tubular portion extending from the wall of the pipe 2, the longitudinal direction of this tubular portion extending in a direction orthogonal to the longitudinal axis of the pipe 2. To be more specific, in the first embodiment represented the two housings 30 and 40 extend parallel to one another on diametrally opposite sides of the pipe 2. Furthermore and in particular, the bottom 33 of each housing 30, 40 is flat and extends in a plane parallel to the longitudinal axis 10 of the pipe 2.

In a particularly advantageous variant, each ultrasound transducer 36, 37 includes a piezoelectric material plate and two conductive electrodes or pins. The piezoelectric material plate of each ultrasound transducer 36, 37 may be protected by a polymer material external coating. In a variant the main faces of each ultrasound transducer 36, 37 are orthogonal to the direction of emission/reception of the ultrasound waves. Each transducer is mounted so that the ultrasound transducers 36, 37 are placed face to face and their respective emission/reception direction coincides with the measurement direction.

Each piezoelectric plate consists of a piezoelectric material. This piezoelectric material must be able to emit and to receive ultrasound signals and in particular signals at a frequency of the order of 4 MHZ. This material is for example a piezoelectric ceramic such as lead zirconate titanate (PZT). There is nothing to prevent use of other piezoelectric materials such as monocrystals.

The flowmeter 1 according to the first embodiment further includes a main receptacle 6 including a main opening 4 and a bottom 5, the concavity of the receptacle being oriented away from the longitudinal axis 10 of the pipe, that is to say toward the outside of the pipe and not in the direction of the longitudinal axis of the pipe. In other words, the opening 4 of the main receptacle 6 is disposed toward the outside of the pipe 2, the bottom 5 of the main receptacle 6 therefore being located closer to the longitudinal axis 10 of the pipe 2 than the opening 4 of the main receptacle 6. Moreover, the receptacle delimits an internal volume to receive at least one electronic circuit card 65 configured to be electrically connected to each ultrasound transducer. Various embodiments may be envisaged where the dimensions and the shapes of the main receptacle 6 are concerned. The main receptacle 6 may have any shape or a cubic or cylindrical shape as in the embodiment represented in FIGS. 1 to 7.

Figure 2:
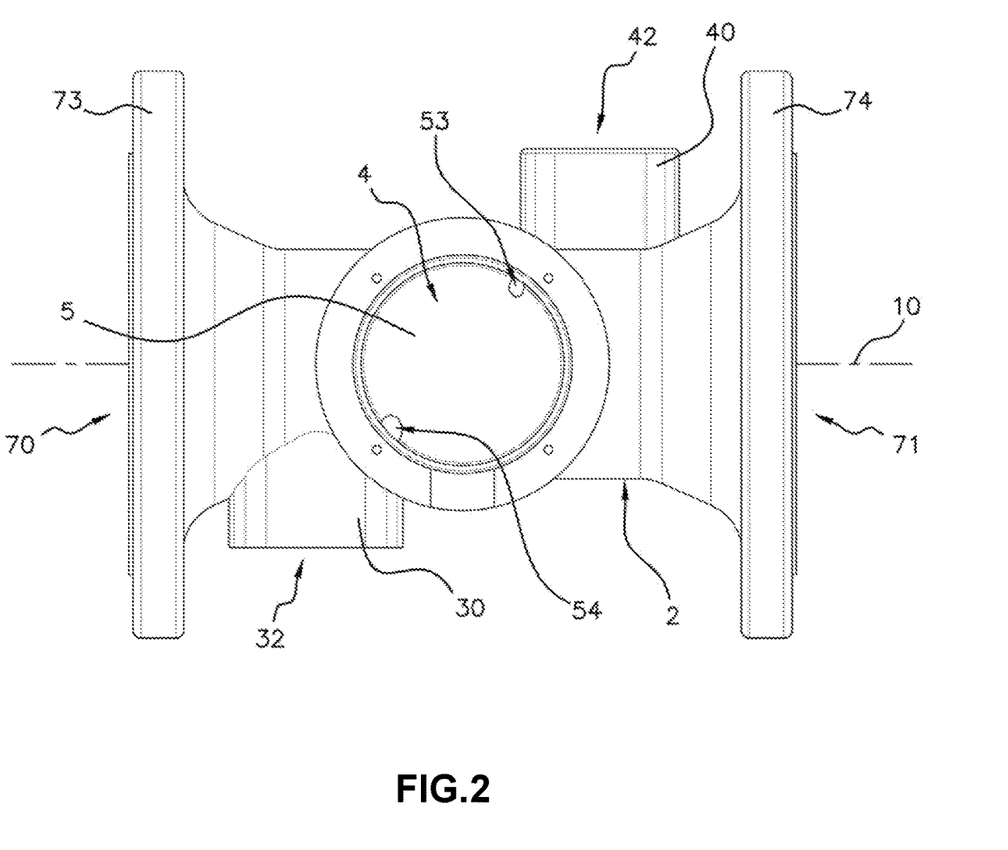
FIG. 2 is a view from above of a flowmeter according to the first embodiment of the invention.
Figure 3:
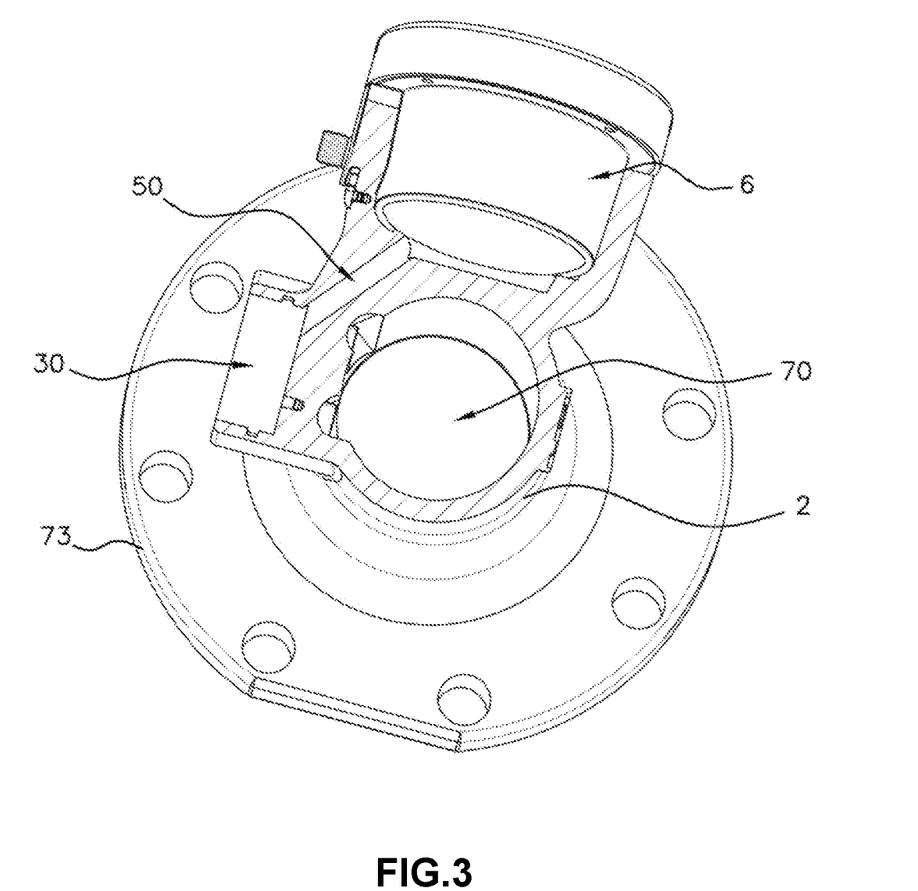
FIG. 3 is a slantwise view in longitudinal section of a pipe of a flowmeter according to the first embodiment of the invention.

In particular, the main receptacle 6 extends in a direction orthogonal to the longitudinal axis 10 of said pipe 2, that is to say the wall forming the main receptacle 6 extends a direction orthogonal to the longitudinal axis 10 of the pipe 2. In the first embodiment represented in FIGS. 1 to 7 the main receptacle 6 includes a wall in the form of a tubular portion extending from the wall of the pipe 2, the longitudinal direction of this tubular portion being a direction orthogonal to the longitudinal axis of the pipe 2. Moreover, in the first embodiment represented the main receptacle 6 extends in a direction intersecting each direction in which each housing 30, 40 extends and the main receptacle 6 more particularly extends in a direction orthogonal to each direction in which each housing 30, 40 extends (as can be seen in FIG. 2 in particular).

The flowmeter 1 further includes a main cover 8 adapted to be able to block the main opening 4 of the main receptacle 6. The main cover may advantageously cover the main opening of said main receptacle temporarily.

The electronic circuit card 65 and other components of the flowmeter to be disposed in the main receptacle 6 may themselves be disposed in a casing 61 adapted to be able to be inserted in said receptacle 6. The casing 61 therefore contains the electronic circuit card 65, said casing being disposed in the internal volume of said main receptacle 6. A casing 61 of this kind enables the assembly of the flowmeter to be facilitated by enabling components of the flowmeter to be first disposed in the latter before it is inserted in the main receptacle 6. A casing 61 of this kind also makes it possible to protect the components that it contains. In particular, when it is made of polymer material the casing 61 makes it possible to guarantee electrical insulation of the electronic circuit card 65 from the body of the flowmeter, in particular the wall of the main receptacle 6 and the pipe if they are made of electrically conductive metal, independently of its nature or of the quality of its coating, if any, or again of the quality of the fixing of the electronic circuit card 65 in the casing 61 and the main receptacle 6.

The body of the flowmeter may include the assembly formed by each housing, the main receptacle 6, the pipe 2 and the connectors 73, 74. The body of the flowmeter may be produced so as to be formed of a single part (in particular for example by casting cast iron or some other metal), or separate parts assembled together, for example by welding.

In the embodiment represented in FIGS. 1 to 7, and as can be seen in FIG. 4 in particular, the electronic circuit card 65 is disposed orthogonally to the bottom 5 of the main receptacle 6. However, in other embodiments (not represented) the electronic circuit card 65 may be disposed in a plane that is not orthogonal at the bottom 5 of the main receptacle 6. Moreover, the electronic circuit card 65 includes connecting pins, also known as external connection pins, other than those used to connect it to each ultrasound transducer. In particular the external connecting pins are configured to connect to the electronic circuit card 65 to equipment enabling the flowmeter according to the invention to communicate with the outside.

In a variant of the flowmeter according to the invention the flowmeter also includes at least one electrical accumulator such as a battery, rechargeable or not, electrically connected to the electronic circuit card 65 and disposed in the main receptacle 6 and in particular inside the case 61.

The flowmeter 1 according to the first embodiment further includes at least one first duct 50 connecting the main receptacle 6 and more particularly the internal volume to receive the electronic circuit card 65 of the main receptacle 6 to the internal volume to receive each ultrasound transducer, that is to say each housing 30, 40. In the embodiments represented each flowmeter includes two ducts 50, a first duct 50 connecting the internal volume to receive the electronic circuit card of the receptacle to the internal volume to receive the first ultrasound transducer and a second duct 50 (not represented) connecting the internal volume to receive the electronic circuit card of the receptacle to the internal volume to receive the second ultrasound transducer, each pipe being formed within the wall of the pipe. Each duct 50 is formed within the wall of the pipe 2, that is to say in particular each duct 50 is formed within the thickness of the material forming the pipe 2. The wall of the pipe 2 may also feature an increased thickness in each zone in which a duct 50 is formed, for example, so as to form a rib 51 inside which a duct is at least partly formed. An increased thickness or rib 51 of this kind may be formed at the moment of moulding the pipe 2, the main receptacle 6 and the housing 30, 40 so as to form a single part. In particular, in the embodiments represented the second duct 50 is identical to the first duct (in terms of shapes and dimensions).

Different embodiments may be envisaged where the shape of each duct is concerned. Each duct may have an at least partly curved (in particular circular) and/or at least partly polygonal right cross-section. This section may be constant or variable. Each duct may be at least partly rectilinear and/or at least partly curved and extend in only one direction or in a plurality of distinct directions, having a single portion or a plurality of successive portions. In particular, each duct is free of portions at an angle of the order of 90° or less to the plane in which the bottom 5 of the main receptacle 6 extends or to an adjacent portion of this duct. Each duct may extend in a direction at an angle between 30° and 70° inclusive to the plane in which the bottom 5 of the main receptacle 6 extends. In the embodiment represented in FIGS. 1 to 7 each duct is rectilinear (and extends in a single longitudinal direction) and has a circular right cross-section. A duct having a diameter of the order of 8 mm of a flowmeter the pipe of which has a diameter of the order of 80 mm and the wall of which has a thickness of the order of 10 mm extends for example in a direction at an angle of the order of 50° to the plane in which the bottom of the main receptacle 6 extends.

As can be seen in FIG. 2, each duct 50 includes an inlet orifice 53, 54 formed through the bottom 5 of the main receptacle 6 and an outlet orifice 55 (as can be seen in FIG. 1) formed through the bottom 33 of the first housing 30.

The flowmeter 1 according to the first embodiment further includes at least one first electric cable (not represented) extending in said first duct 50 to electrically connect the ultrasound transducers 36, 37 of the first housing 30 to the electronic circuit card 65 and at least one second electric cable (not represented) extending in the second duct to electrically connect the ultrasound transducers of the second housing 40 to said electronic circuit card 65 disposed in the main receptacle 6.

The flowmeter 1 further includes a packing material chosen in a group formed of thermoset resins. A packing material of this kind fills the internal volume to receive the first ultrasound transducer and the internal volume to receive the second ultrasound transducer at least in part. The packing material further fills at least in part each duct and the internal volume to receive the electronic circuit card 65, that is to say the main receptacle 6. Each duct 50 is adapted to enable the flow of a packing material of this kind in liquid form.

Figure 8:
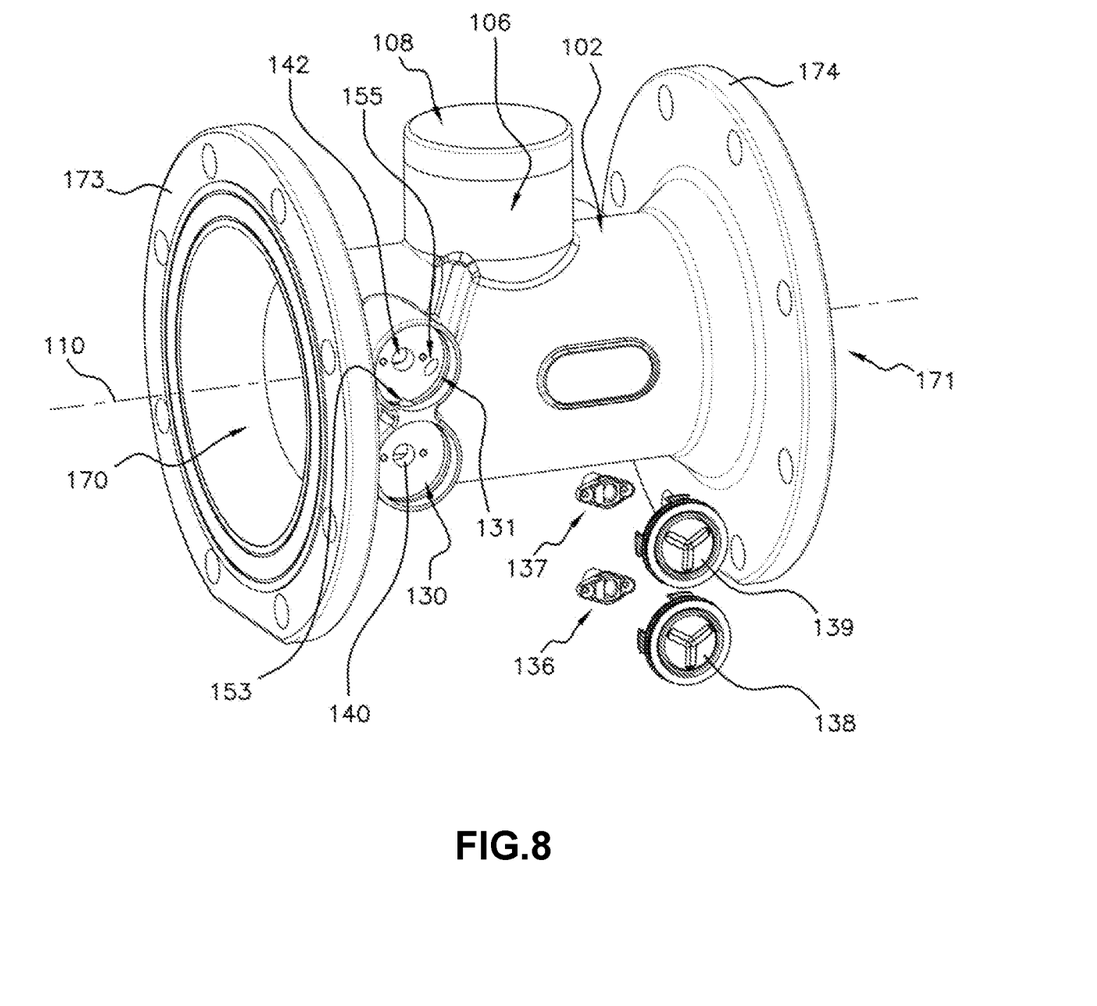
FIG. 8 is a front view of a flowmeter according to a second embodiment of the invention before mounting the ultrasound transducers.
Figure 9:
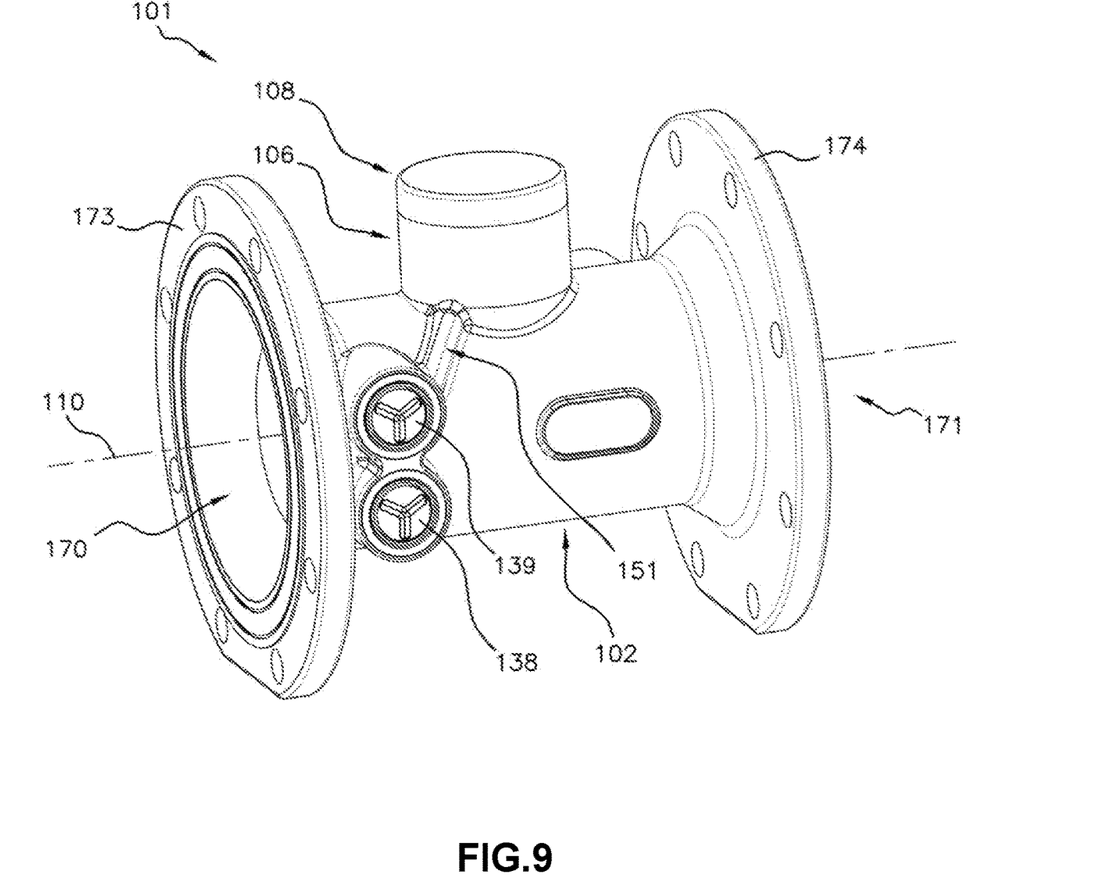
FIG. 9 is a front view of a flowmeter according to the second embodiment of the invention after mounting the ultrasound transducers.

A second embodiment of a flowmeter according to the invention is represented in FIGS. 8 and 9. The flowmeter 101 differs from the flowmeter 1 according to the first embodiment in that it includes four housings 130, 131, each housing 130, 131 delimiting an internal volume to receive a single ultrasound transducer 136, 137. Alternatively, the flowmeter 101 includes two housings 130, 131, each housing 130, 131 delimiting an internal volume to receive a single ultrasound transducer 136, 137.

The bottom of each housing 130, 131 includes a niche 140, 142 adapted to receive the distal end of each ultrasound transducer 136, 137.

The flowmeter 101 further includes lateral covers 138, 139 adapted to block the opening of each housing 130, 131, the cover 138 blocking the opening of the housing 130 and the lateral cover 139 blocking the opening of the housing 131.

The flowmeter 101 also includes two ducts connecting the main receptacle 106, and more particularly the internal volume to receive the electronic circuit card 65 of the main receptacle 106, to the internal volume to receive each ultrasound transducer, that is to say to each housing 130, 131. The wall of the pipe 102 may have an increased thickness in each zone in which a duct is formed for example so as to form a rib 151 inside which a duct is at least partly formed. Each duct opens into a housing 131 via an outlet orifice 155.

The flowmeter 101 further includes a main cover 108 adapted to be able to block the main opening of the main receptacle 106.

A secondary duct may be formed within adjacent walls of the housings 130, 131 in order to connect the internal volume of the housing 130 to the internal volume of the housing 131, this secondary duct including an inlet orifice 153 (FIG. 8).

The pipe 102 takes the general form of a tube terminated at both ends by annular connectors 173, 174 adapted to be assembled to pipes by means of assembly members such as nuts and bolts. Between the connectors 173, 174 the pipe may have passed through it a fluid from a fluid inlet 170 to a fluid outlet 171.

Each flowmeter may further include a display electrically connected to said electronic circuit card. A display of this kind may be situated under the main cover 8 of the main receptacle 6. Moreover, a display of this kind, including for example interface electronics coupled to an LCD screen, enables a user to read the information supplied by the flowmeter.

In order to assemble the flowmeter 1, 101 according to the invention some or all of the following steps may be carried out:

at least one ultrasound transducer 36, 37, 137, 136 is mounted in the internal volume to receive the first ultrasound transducer of the first housing 30, 130, 131 and at least one second ultrasound transducer is mounted in the internal volume to receive the second ultrasound transducer of the second housing 40, said electronic circuit card 65 is mounted in the internal volume to receive said electronic circuit card of said main receptacle 6, said electronic circuit card 65 is electrically connected to the first ultrasound transducer 36, 37, 137, 136 and to the second ultrasound transducer. To this end, and in particular, at least one first electric cable is introduced into the first duct electrically connecting first ultrasound transducer 36, 37, 137, 136 to the electronic circuit card 65 and at least one second electric cable is introduced into the second duct electrically connecting the second ultrasound transducer to the electronic circuit card 65, the lateral covers 39, 49, 138, 139 are mounted over the opening 32, 42 of each housing 30, 40, 130, 131, after electrically connecting said electronic circuit card 65 to the first ultrasound transducer 36, 37, 137, 136 and to the second ultrasound transducer, a packing material is introduced in liquid form via the main opening of the main receptacle 6, a step is carried out to polymerize and/or harden said packing material (for example heating to a predetermined temperature, in particular as a function of the nature of the packing material).

To be more specific, in the case of the flowmeter 1 according to the first embodiment, the lateral cover 39 is mounted over the opening 32 of the housing 30 and the cover 49 is mounted over the opening 42 of the housing 40.

It may furthermore also be possible to subject the main receptacle of the flowmeter to a pressure lower than atmospheric pressure, in particular a pressure between 5 mbar and 20 mbar inclusive To this end the internal volume of the main receptacle may be connected to a suction ("vacuum") source during the step of introducing the packing material into the flowmeter and/or after the step of introducing the packing material into the flowmeter. This makes it possible to facilitate the evacuation of the air contained in the flowmeter in favor of the packing material. It is equally possible to dispose the flowmeter in an enclosure in which the pressure is below atmospheric pressure.

The arrangement of the items disposed in the internal space of the casing is adapted so that the packaging material is able to expand in the liquid state from the main receptacle 6 via the ducts 50 as far as each housing 30, 40. In particular, the casing 61 may include openings in its bottom in order to allow the packing material in liquid form to flow toward the bottom of the main receptacle 6 and the ducts 50.

At the end of the process of assembling the various components of the flowmeter the opening 4 of the main receptacle 6 advantageously allows the introduction of a packing material in liquid form chosen in a group formed of thermoset resins. In particular, said packing material is chosen in a group formed of epoxide (or as they are more commonly known epoxy) resins, polyurethanes, silicones (in particular polydimethylsiloxanes (PDMS)), copolymers thereof and mixtures thereof.

After being introduced via the opening 4 of the main receptacle 6 the packing material in liquid form flows toward each duct 50 via the inlets 53, 54 of each duct toward each of the housings 30, 40.

A flowmeter 1, 101 obtained on completion of an assembly method according to the invention includes a packing material filling at least in part the internal volume to receive each ultrasound transducer 36, 37, 137, 136 of each housing 30, 130, 131, each duct 50 and the internal volume of the main receptacle 6, 106 (that is to say the internal volume to receive the electronic circuit card).

In a flowmeter 101 according to the second embodiment represented in FIGS. 8 and 9, the packing material in liquid form furthermore flows from each housing 131 to each housing 130 through a secondary channel via the inlet orifice 153.

A flowmeter 1, 101 obtained on completion of the assembly method described hereinabove constitutes a measurement body that can be customized. In fact, at this stage a flowmeter 1, 101 of this kind is able to measure a flowrate and to calculate volumes. Thus a flowmeter 1, 101 of this kind may be calibrated by connecting it to a test rig. Nevertheless a flowmeter 1, 101 of this kind does not include a user interface for interacting with a user of the flowmeter.

In order to mount a user interface of this kind in the flowmeter 1, 101 some or all of the following steps may be carried out:
- at least one user interface is procured; it may include a display and an electrical accumulator such as a battery as described above; moreover, the user interface may include communication means such as a transmitter-receiver; in one particular embodiment the user interface is mounted behind a sealed transparent cover so as to protect the user interface. To this end a transparent resin may be used to cover the user interface when it is mounted in the transparent sealed cover. In this case a resin will be chosen having optical properties to prevent condensation at the level of the display of the user interface;
- the main cover 8 is removed from the main receptacle 6;
- a packing material in liquid form is introduced via the main opening of the main receptacle 6 so as to fill all or part of the remaining empty volume of the internal volume of the main receptacle 6;
- the user interface is electrically connected to the electronic circuit card 65 and the user interface is positioned in a remaining empty volume of the internal volume of the main receptacle 6;
- the flowmeter 1, 101 is turned over so that the packing material coats the user interface;
- a step is carried out of polymerisation and/or hardening of said packing material (for example by heating to a temperature predetermined in particular as a function of the nature of the packing material); and
- the main cover 8 is placed on the main receptacle 6. In one particular embodiment the cover 8 is replaced by a finalization cover. A finalization cover of this kind may carry necessary signalling information and/or information regarding customisation of the flowmeter 1, 101.

Thus the flowmeter 1, 101 obtained on completion of this assembly method is complete, that is to say capable of measuring and communicating its measurements without using a proprietary system.

A flowmeter according to the invention makes it possible to facilitate the step of filling with a packing material of a method of manufacturing a flowmeter and to reduce the time needed for such production because a single step of introducing said packing material suffices, the introduction of the packing material into the main receptacle 6 sufficing to enable distribution and filling by the packing material of each housing 30, 130, 131 of each duct 50 and of the main receptacle.

Moreover, the transparent lateral covers 39, 49, 138, 139 enable monitoring of correct filling of the housings 30, 40, 130, 131 with the packing material during the introduction of the latter in the liquid state, that is to say the progressive increase in the level of packing material in liquid form as the latter flows from the main receptacle through the ducts 5.

A packing material of this kind has the advantage of assuring the sealing of said flowmeter, in particular from the fluid circulating in the pipe, and moreover makes it possible to consolidate the assembly of all the components of the flowmeter, the packing material hardening in contact with the pipe inside each of the ducts, each housing 30, 40 and the main receptacle 6. The packing material therefore enables protection of the electric contacts and the electric cables of the transducers and of the electronic circuit card disposed inside the main receptacle and connecting them via the ducts 50.

A flowmeter according to the invention further has a reliability, a service life and a resistance in aggressive environments, in particular in liquid media, enabling its use for commercial or regulatory purposes.

The invention is open to numerous variants and applications other than those described hereinabove. In particular, it goes without saying that unless otherwise indicated the various structural and functional features of each of the embodiments described hereinabove must not be considered as combined and/or intimately and/or inextricably connected to one another, but to the contrary as simple juxtapositions. Moreover, the structural and/or functional features of the various embodiments described hereinabove may be the subject in whole or in part of any different juxtaposition or any different combination. For example, it is equally possible to dispose the electronic circuit card differently, in particular horizontally and possibly to provide one or more holes through the thickness of the electronic circuit card in order to facilitate the passage of the packing material inside the main receptacle 6 and/or the casing 61. Moreover, it is equally possible to provide a method of assembling a flowmeter according to the invention in which the packing material would be introduced via the opening of one of the housings 30, 40, 130, 131, the ducts enabling a packing material in liquid form to flow toward the other housing or housings to receive ultrasound transducers and/or toward said main receptacle.

The invention claimed is:

1. A flowmeter comprising:
 - a pipe for measuring the flowrate of a fluid, said pipe extending along a longitudinal axis,
 - at least one first ultrasound transducer and at least one second ultrasound transducer, said ultrasound transducers being mounted facing one another relative to a wall of said pipe,
 - at least one first housing delimiting an internal volume to receive said first ultrasound transducer and at least one second housing delimiting an internal volume to receive said second ultrasound transducer,
 - at least one electronic circuit card electrically connected to the first ultrasound transducer and to the second ultrasound transducer,
 - a main receptacle including a main opening and a bottom, the main receptacle also having a concavity being oriented away from a longitudinal axis of the pipe, said main receptacle delimiting an internal volume to receive said electronic circuit card,
 - wherein said flowmeter includes:
   - at least one first duct connecting the internal volume of said main receptacle to receive said electronic circuit card to the internal volume of said first housing to receive said first ultrasound transducer, the first duct being formed within the wall of said pipe, at least one second duct connecting the internal volume of said main receptacle to receive said electronic circuit card to the internal volume of said second housing to receive said second ultrasound transducer, the second duct being formed within the wall of said pipe, a single mass of packing material, formed of thermoset resin, said single mass of packing material filling at least in part each one of said internal volume of said first housing to receive said first ultrasound transducer, said internal volume of said second housing to receive said second ultrasound transducer, said first duct and said second duct, and said internal volume of said main receptacle to receive said electronic circuit card.

2. The flowmeter as claimed in claim 1, wherein said flowmeter further includes at least one first electric cable extending in said first duct so as electrically to connect said first ultrasound transducer to said electronic circuit card and at least one second electric cable extending in said second duct so as electrically to connect said second ultrasound transducer to said electronic circuit card.

3. The flowmeter as claimed in claim 1, wherein the wall of the pipe has an increased thickness in zones, such that in each zone, in which there is formed a duct, there is a rib within which said duct is at least in part formed.

4. The flowmeter as claimed in claim 1, wherein said flowmeter includes a main cover adapted to block the main opening of said main receptacle.

5. The flowmeter as claimed in claim 1, wherein each housing includes an opening and a bottom, each housing having a concavity that is oriented away from the longitudinal axis of said pipe.

6. The flowmeter according to claim 5, wherein said flowmeter comprises lateral covers adapted to block the opening of each housing.

7. The flowmeter as claimed in claim 6, wherein said lateral covers are transparent.

8. The flowmeter as claimed in claim 1, wherein said flowmeter further includes a casing containing said electronic circuit card, said casing being disposed in the internal volume of said main receptacle.

9. The flowmeter as claimed in claim 1, wherein said first ultrasound transducer and said second ultrasound transducer extend in a direction orthogonal to the longitudinal axis of said pipe.

10. The flowmeter as claimed in claim 1, wherein said flowmeter includes four ultrasound transducers, the receiving internal volume of each of said first and second housings receiving two ultrasound transducers.

11. The flowmeter as claimed in claim 1, wherein said flowmeter further includes a third housing to receive at least one ultrasound transducer and a fourth housing to receive at least one ultrasound transducer.

12. A method of assembling a flowmeter as claimed in claim 1, said method comprising the following steps:
said first ultrasound transducer is mounted in the internal volume to receive said first ultrasound transducer of said first housing and said second ultrasound transducer is mounted in the internal volume to receive said second ultrasound transducer of said second housing,
said electronic circuit card is mounted in the internal volume to receive said electronic circuit card of said main receptacle,
said electronic circuit card is electrically connected to the first ultrasound transducer and to the second ultrasound transducer,
after electrically connecting said electronic circuit card to the first ultrasound transducer and to the second ultrasound transducer a packing material is introduced in liquid form via the main opening of the main receptacle, and
a step is carried out of polymerizing and/or hardening said packing material.

13. The method as claimed in claim 12, wherein at least one first electric cable is introduced into the first duct electrically connecting the first ultrasound transducer to the electronic circuit card and at least one second electric cable is introduced into the second duct electrically connecting the second ultrasound transducer to the electronic circuit card.

14. The method as claimed in claim 12, wherein said method further includes the following steps:
at least one user interface is obtained including a display, an electrical accumulator and communication means,
the main cover is removed from the main receptacle,
a packing material in liquid form is introduced via the main opening of the main receptacle so as to fill all or part of the remaining empty volume of the internal volume of the main receptable,
the user interface is electrically connected to the electronic circuit card and the user interface is positioned in a remaining empty volume of the internal volume of the main receptacle,
the flowmeter is turned over so that the packing material coats the user interface,
a step is carried out of polymerizing and/or hardening said packing material,
the main cover is placed on the main receptacle.

15. The method as claimed in claim 12, further comprising the step of, before introducing said packing material in liquid form, blocking openings of each housing by lateral covers.

* * * * *